3,792,065
PRODUCTION OF ANTHRAQUINONE-ALPHA-SULFONIC ACIDS

Heinrich Hiller, Mannheim, and Wolfgang Jentzsch, Frankenthal, Germany, assignors to Badische Anilin- & Soda-Fabrik Aktiengesellschaft, Ludwigshafen am Rhine, Germany
No Drawing. Filed Jan. 10, 1972, Ser. No. 216,766
Claims priority, application Germany, Jan. 16, 1971, P 21 02 037.1
Int. Cl. C09b 1/00
U.S. Cl. 260—370
8 Claims

ABSTRACT OF THE DISCLOSURE

Production of anthraquinone-1-sulfonic acid, anthraquinone-1,5-disulfonic acid and anthraquinone-1,8-disulfonic acid which are substantially devoid of mercury in which the sulfonation mixture or the strong sulfuric acid solution is treated at elevated temperature with a nonmetallic reducing agent whose redox potential is from +0.1 to −0.5 volt. After working up, anthraquinone-1-sulfonic acid, anthraquinone-1,5-disulfonic acid and anthraquinone-1,8-disulfonic acid whose mercury content is $1 \times 10^{-4}\%$ by weight and a filtrate having a content of less than $1 \times 10^{-4}\%$ by weight of mercury are obtained.

---

The invention relates to a process for the production of anthraquinone-1-sulfonic acid, anthraquinone-1,5-disulfonic acid and anthraquinone-1,8-disulfonic acid which are substantially devoid of mercury.

In the production of anthraquinone-1-sulfonic acid and 1,5-anthraquinone and 1,8-anthraquinone disulfonic acids (these sulfonic acids also being known as anthraquinone-α-sulfonic acids) by sulfonation of anthraquinone by means of oleum, mercury sulfate is used as catalyst in an amount of about 1 to 2% by weight, based on the anthraquinone. In the case of the production of anthraquinone-1-sulfonic acid the reaction mixture, also known as the sulfonation mixture, is diluted with water and the precipitated unreacted anthraquinone is filtered off. The filtrate contains the anthraquinone-1-sulfonic acid in dissolved form together with a large amount of sulfuric acid and a small amount of the mercury used in the form of sulfate as catalyst. The major portion of the mercury used is in the recovered anthraquinone. In the case of the production of anthraquinone-1,5-disulfonic acid and anthraquinone-1,8-disulfonic acid, the 1,5-disulfonic acid is precipitated by adjusting the sulfonation mixture to a sulfuric acid concentration of 85 to 95% by weight and the precipitate is worked up separately from the filtrate which contains the 1,8-disulfonic acid.

The mercury contained in the filtrate and in the precipitates is in organic combination and therefore can only be precipitated for example as mercury sulfide by a very troublesome method.

Attempts to remove the mercury from these strong sulfuric acid solutions by electrolysis have been abortive, because under the reduction conditions the anthraquinone sulfonic acids are also reduced and thus destroyed. Similar results have been obtained in attempts to precipitate the mercury present in the solution by baser metals such as zinc or iron, a process known as cementation.

We have now found that substantially mercury-free anthraquinone-α-sulfonic acids are obtained by precipitation with reducing agents of the mercury used as catalyst in the sulfonation by treating the sulfonation mixture or the strong sulfuric acid solution of the anthraquinone-1,5-disulfonic acid and anthraquinone-1,8-disulfonic acids (which may have been freed from unreacted anthraquinone) at a temperature of from 80° C. to the boiling point of the mixture or solution at standard pressure with a nonmetallic reducing agent whose redox potential in the solution concerned is from +0.1 to −0.5 volt (measured against the standard hydrogen electrode) until no further detectable precipitation of mercury is taking place, separating the deposited mercury and isolating the anthraquinone sulfonic acids by a conventional method.

The redox potential of the reducing agent used has to be greater than corresponds to the transition

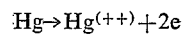

i.e. in the case of 1-molar $Hg^{(++)}$ solution, the redox potential of the reducing agent should be not more than +0.86 volt. On the other hand the redox potential of the reducing agent should not be less than −0.5 volt, because otherwise there is a risk of reductive destruction of the anthraquinone-α-sulfonic acids. For removal of mercury in the strong sulfuric acid solutions or sulfonation mixture those reducing agents are suitable whose redox potentials in the strong acid media lie at from +0.1 to −0.5 volt, preferably from +0.0 to −0.5 volt.

Examples of suitable reducing agents are: the alkali metal sulfites or alkali metal hydrogen sulfites such as sodium or potassium sulfite, sodium or potassium hydrogen sulfite (−0.14 volt), sulfur dioxide, formic acid and alkali metal salts thereof (−0.2 volt), formaldehyde (±0.0 volt), oxalic acid and neutral or acid alkali metal salts thereof (−0.47 volt), glucose and cane sugar. In carrying out the process on a technical scale, it is preferred to use sodium sulfite, sodium hydrogen sulfite, potassium sulfite, potassium hydrogen sulfite, and glucose as reducing agents.

Metallic reducing agents cannot be used for the precipitation in the present case, even when their redox potential lies within the range specified as suitable, because at least some of the anthraquinone-α-sulfonic acids are destroyed by metals.

Mercury deposited in this way collects at the bottom of the stirred vessel because of its high specific gravity and can be separated in a simple way by choosing as the reaction vessel a container having a conical bottom with a drain valve at the apex.

The process may be carried out advantageously by heating the strong sulfuric acid solution, which contains for example the anthraquinone-α-sulfonic acid, to from 80° C. to the boiling point of the solution, for example by passing in steam and then adding the reducing agent in portions while stirring. In the case of solid reducing agents, these are conveniently added in the form of aqueous solutions. It has proved to be advantageous not to introduce the reducing agent onto the solution to be freed from mercury but through a tube dipping into the solution. The mercury separates spontaneously in the process so that it is easy to see whether precipitation is complete or whether mercury is precipitated when more reducing agent is added. The treatment and thus the precipitation generally takes from one hour to ten hours, usually from one hour to three hours. The deposited mercury may then easily be separated from the supernatant solution, for example by draining it through a valve at the bottom, or by siphoning off or decanting the supernatant solution from the precipitated mercury.

It is possible according to the process of the invention to separate 90 to 99% of the mercury introduced in the form of the sulfate as the catalyst from the sulfonic acids or the sulfonation mixture as metal and to recover it in exploitable form.

Anthraquinone-1-sulfonic acid, anthraquinone-1,5-disulfonic acid and anthraquinone-18-disulfonic acid whose content of mercury is $1 \times 10^{-4}\%$ by weight or less can be obtained according to the process of the invention."

Filtrates whose mercury content is from $1\times10^{-4}$ to $1\times10^{-5}\%$ by weight or even less are obtained.

The following explanatory examples illustrate the process of the invention. The parts and percentages specified are by weight.

EXAMPLE 1

210 parts of anthraquinone is sulfonated by a known method with 210 parts of 20% oleum and 2 parts of mercury sulfate at 120° C. The whole is diluted with 680 parts of ice-water and filtered off from unreacted anthraquinone while hot. The anthraquinone residue is washed until free from acid. The filtrate and the first (strongly acid) washing filtrate are combined (about 1000 parts). The mercury concentration of this filtrate mixture varies between 0.03 and 0.1%.

The whole is boiled gently (for example by passing in steam at 4 atmospheres gauge) and aqueous 20% sodium sulfite solution is allowed to flow in below the surface through a dip tube. Metallic mercury which separates spontaneously is drained off. Sulfite solution is added in small portions and with vigorous stirring until no further deposition of mercury is detected. This is the case after from about five to ten parts of sodium sulfite has been added. The mercury concentration of the solution can be reduced in this way to about $1\times10^{-4}\%$; the potassium salt of anthraquinone-1-sulfonic acid precipitated in known manner by means of a potassium chloride solution has a mercury content of less than $1\times10^{-4}\%$.

EXAMPLE 2

4200 parts of anthraquinone is sulfonated by a known method with 4200 parts of 20% oleum and 25 parts of mercury sulfate at 120° C. The mixture is then diluted with 20,000 parts of water and the unreacted anthraquinone is filtered off and washed with 7000 parts of water. After the filtrate has been buffered with 100 to 200 parts of caustic soda it is gassed with sulfur dioxide in a closed container until a sulfur dioxide pressure of 0.1 to 0.5 atmosphere gauge has been set up and this is maintained until precipitation of mercury has ceased (about one hour to two hours). After the metallic mercury has been drained off the anthraquinone-1-sulfonic acid present in the solution is precipitated as the potassium salt (diamond salt).

| | Mercury content when the mercury has— | |
|---|---|---|
| | Been precipitated, percent | Not been precipitated, percent |
| Potassium salt of anthraquinone-1-sulfonic acid | $1\times10^{-4}$ | 0.2 |
| Filtrate | $1\times10^{-5}$ | 0.02 |

EXAMPLE 3

100 parts of mercuric sulfate is dissolved in 4800 parts of 96% sulfuric acid and 4800 parts of 24% oleum. 8000 parts of anthraquinone is then stirred in, another 9000 parts of 65% oleum is added and the mixture is heated at 120° C. for four hours. The mixture is then diluted with 4800 parts of 96% sulfuric acid and then with 9700 parts of 78% sulfuric acid, and stirred for four hours at 50° C.

The precipitated anthraquinone-1,5-disulfonic acid is filtered off.

(a) Working up the anthraquinone-1,5-disulfonic acid:

The filtered material is dissolved in 15,000 parts of water at 95° to 100° C. Then at this temperature 250 parts of formic acid is added uniformly over one hour to two hours through a dip tube and the deposited metallic mercury is drained off. Sodium anthraquinone-1,5-disulfonate is separated from the solution by adding 20,000 parts of saturated common salt solution.

| | Mercury content when the mercury has— | |
|---|---|---|
| | Been precipitated, percent | Not been precipitated, percent |
| Disodium salt of anthraquinone-1,5-disulfonic acid | $1\times10^{-4}$ | $4\times10^{-2}$ |
| Filtrate of anthraquinone-1,5-disulfonic acid | $1\times10^{-5}$ | $6\times10^{-3}$ |

(b) Working up the sulfuric acid mother liquor:

The sulfuric acid mother liquors which contain the anthraquinone-1,8-disulfonic acid also formed in the sulfonation are heated for twenty hours at 180° C., cooled to 120° to 150° C., 30,000 parts of water is added and the precipitated anthraquinone is filtered off. After the filtered material has been washed with 10,000 parts of water, the washing water and filtrate are heated to 100° C. and a solution of 200 parts of sodium sulfite in 1000 parts of water is introduced at a regulated rate by means of a dip tube. It is advantageous to use a pressure of 0.1 to 0.5 atmosphere gauge. After metallic mercury has been drained off, a waste liquor is obtained which contains less than $1\times10^{-4}\%$ of mercury.

When mercury is not precipitated, a waste liquor is obtained which contains about 0.05% of mercury.

EXAMPLE 4

210 parts of anthraquinone is sulfonated with 210 parts of 20% oleum and 2 parts of mercuric sulfate at 120° C. Dilution and separation of unreacted anthraquinone are carried out as in Example 1. The filtrate mixture obtained is gently boiled and then a 20% glucose solution is allowed to flow in beneath the surface through a dip tube. The mercury which separates spontaneously is drained off. Glucose solution is added in small portions and with vigorous stirring until there is no further detectable precipitation of mercury. This is the case after about 5 to 10 parts of glucose has been added. The mercury concentration of the solution can be reduced in this way to about $1\times10^{-4}$. The potassium salt of anthraquinone-1-sulfonic acid precipitated in known manner by means of a potassium chloride solution has a mercury content of from $1\times10^{-3}\%$ to $1\times10^{-4}\%$.

We claim:

1. A process for the production of anthranquinone-$\alpha$-sulfonic acids which are substantially devoid of mercury by precipitation with reducing agents of the mercury used as catalyst in the sulfonation of anthraquinone, which process comprises:

treating the sulfonation mixture or a strong sulfuric acid solution of at least one product selected from the class consisting of anthraquinone-1-sulfonic acid, anthraquinone-1,5-disulfonic acid and anthraquinone-1,8-disulfonic acid at a temperature of from 80° C. to the boiling temperature of the mixture or solution at atmospheric pressure with a noinmetallic reducing agent selected from the class consisting of glucose, sodium sulfite, potassium sulfite, sodium hydrogen sulfite, potassium hydrogen sulfite, sulfur dioxide, formic acid, sodium formate, potassium formate, oxalic acid and the acid or neutral alkali metal salts of oxalic acid, until no further detectable precipitation of mercury takes place;

separating deposited mercury from the treated mixture or solution; and isolating the anthraquinone suufonic acid product substantially free of mercury.

2. A process as claimed in claim 1 wherein said reducing agent is selected from the class consisting of sodium sulfite, sodium hydrogen sulfite, potassium sulfite, potassium hydrogen sulfite, sulfur dioxide and glucose.

3. A process as claimed in claim 1 wherein the sulfonation mixture consists essentially of anthaaquinone-1-sulfonic acid as the product to be isolated.

4. A process as claimed in claim 2 wherein the sulfonation mixture consists essentially of anthraquinone-1-sulfonic acid as the product to be isolated.

5. A process as claimed in claim 1 wherein the sulfonation mixture consists essentially of a mixture of anthraquinone-1,5-disulfonic acid and anthraquinone-1,8-disulfonic acid as the product to be isolated.

6. A process as claimed in claim 2 wherein the sulfonation mixture consists essentially of a mixture of anthraquinone-1,5-disulfonic acid and anthraquinone-1,8-disulfonic acid as the product to be isolated.

7. A process as claimed in claim 1 wherein the strong sulfuric acid solution to be treated consists essentially of anthraquinone-1,5-disulfonic acid as the product to be isolated.

8. A process according to claim 2 wherein the strong sulfuric acid solution to be treated consists essentially of anthraquinone-1,5-disulfonic acid as the product to be isolated.

References Cited
FOREIGN PATENTS
119,876   5/1959   Russia _____ 260—370

LORRAINE A. WEINBERGER, Primary Examiner

E. J. SKELLY, Assistant Examiner

UNITED STATES PATENT OFFICE
CERTIFICATE OF CORRECTION

Patent No. 3,792,065          Dated February 12, 1974

Inventor(s) Heinrich Hiller and Wolfgang Jentzsch

It is certified that error appears in the above-identified patent and that said Letters Patent are hereby corrected as shown below:

Column 1, line 59, insert -- - -- after "anthraquinone"

Column 2, line 69, insert -- , -- before "8-disulfonic"

Column 4, line 57, "noinmetallic" should read -- nonmetallic --.

Column 4, line 67, "suufonic" should read -- sulfonic --.

Column 4, line 74, "anthaaquinone" should read -- anthraquinone -

Signed and sealed this 22nd day of October 1974.

(SEAL)
Attest:

McCOY M. GIBSON JR.                C. MARSHALL DANN
Attesting Officer                  Commissioner of Patents